Oct. 11, 1955     H. C. McBRAIR     2,720,107
DEW-POINT HYGROMETER
Filed Jan. 29, 1953     3 Sheets-Sheet 1

Fig. 1

INVENTOR
*Henry C. McBrair*
BY
*Robert S. Dunham*
ATTORNEY

Fig. 2A

United States Patent Office 2,720,107
Patented Oct. 11, 1955

2,720,107

DEW-POINT HYGROMETER

Henry C. McBrair, Caldwell, N. J., assignor to Wallace & Tiernan Incorporated, a corporation of Delaware Application January 29, 1953, Serial No. 333,877

17 Claims. (Cl. 73—17)

This invention relates to hygrometric apparatus, and more particularly to electrical dew-point hyrogmeters such as are to be used for detecting the dew-point of air or other gas which is supplied to the apparatus or to which an appropriately sensitive element of the apparatus is subjected. Instruments of this sort have various uses, notably for meterological observation, and for optimum effectiveness it is desired to provide an instrument which will afford continuous measurement or other detection of dew-point and which will have a high accuracy of response over a wide variation of dew-points and over a wide range of actual temperatures of the atmosphere under investigation, e. g. extending to extremely low temperatures such as found in the upper air or in polar regions and also to temperatures more customarily encountered at or near the ground. Apparatus of the present type is also useful for general laboratory measurements, e. g. of dew-point, as well as in commercial sampling and measurements.

In general, one effective type of dew-point hygrometer includes a mirror element exposed to the air or other gas under observation (such air, for example, being supplied as a continuous stream to the mirror surface), together with a lamp for illuminating the surface with light rays directed at an acute angle, and a pair of photoelectric tubes of which one is placed to receive rays specularly reflected by the mirror and the other is placed to receive rays directly transmitted to it from the lamp, and in some cases also rays which are diffusely reflected from the mirror surface, i. e. when there is dew on such surface. It will be understood, in passing, that the term "dew" is herein employed to indicate water condensed in a diffuse mass of discrete droplets or particles (as distinguished from a single large drop of water) and thus includes ice and frost as the forms in which dew appears at low temperatures. By appropriate means, heretofore provided by an alternating or vibrator-interrupted voltage supply in the phototube circuits, an undulating electrical output is derived from the phototubes, to have characteristics of magnitude and phase which represent the amount of dew, if any, on the mirror surface and the direction in which such amount departs, if at all, from a predetermined condition.

To effectuate the formation of such dew, cooling means are provided for the mirror, usually involving a copper or like member in thermally conductive relation to the mirror and to a coolant mass (such as Dry Ice in alcohol) or a mechanical refrigerating device or the like. To adjust and regulate the mirror temperature, heating means are provided, most conveniently in the form of an electrical coil around the periphery of the mirror, energized by an electronic oscillator so that radio frequency oscillations are supplied to the coil for heating the mirror, the latter preferably being composed of or mounted upon an iron or other magnetic body which is rapidly responsive to inductive or like heating effects.

In the form of apparatus described above, the undulant electrical signal from the photoelectric tubes is utilized, by appropriate amplification and demodulation, to establish a direct voltage which is arranged to constitute at least part of a control bias for the electronic oscillator, so that the output of the oscillator, and thus the heating effect of the coil, is substantially instantaneously conrolled by the magnitude of the D. C. bias and in accordance with changes of the latter. As will be appreciated, such instrument is intended to maintain the mirror surface at the dew-point of the supplied air, by maintenance of the dew on the mirror surface in a more or less predetermined condition, the cooling means tending to cool the surface below the lowest dew-point expected and the heating means being adjusted to raise the mirror temperature to more or less exactly the actual dew-point of the passing gas.

Appropriate means are also included to detect the actual temperature of the mirror surface, preferably if possible the actual temperature of the forming dew, a convenient example of such means being a thermocouple disposed at or immediately below the mirror surface and having its electrical leads extended to a suitable indicating, recording or other instrument (of known, conventional type for measurement of thermocouple currents), which thus affords the desired, direct detection of dew-point.

Since the electronic oscillator output in the system described above depends on the applied bias, and the bias in turn is furnished, in effect, by the electrical output of the balanced phototubes, it will be seen that the actual thickness or quantity of dew under equilibrium conditions will vary with the absolute value of the dew-point. For example, upon a rise in dew-point (i. e. change in moisture characteristic of the supplied air), the tendency of the mirror arrangement will be to increase the amount of dew, thus enlarging the undulating output of the photo devices and electrically adjusting the oscillator to provide the desired, greater heating effect at the mirror surface.

While this servo system will come to a new state of electrical balance at a higher temperature governed by the rise in dew-point, the amount of heat continuously furnished thereafter cannot drop back to the value of rate of heat supply at the previous equilibrium condition, but must be a little higher in order to maintain the mirror at or near the new dew-point, even though this rise in rate of heat supply may not be as great as was transiently required to reach the new condition of equilibrium. Nevertheless, for maintenance of such higher rate of heat supply, larger biasing voltage (in a positive direction) must be derived from the phototubes, and such output can only be achieved if the amount of dew, e. g. customarily considered as the dew thickness, is somewhat higher than before. Reverse operation takes place upon change of dew-point in an opposite direction, so that throughout a given range the actual maintained dew thickness varies with the equilibrium temperature maintained at the mirror surface.

For many purposes a reasonably close approximation of the dew-point is nevertheless achieved, but it is found that the varying dew thickness may represent considerable inaccuracy, i. e. in departure of the mirror temperature from actual dew-point, especially in portions of a wide range of temperatures over which the device may be expected to operate. Thus at higher dew-points the dew thickness may become so great as to cause puddling of the dew, with detriment to the desired optical response and to the accuracy of results. Alternatively, if adjustment is made for the device to servo at an average, rather thin dew condition which represents accuracy over, say, an upper part of the temperature range, the dew deposit may become ineffectually thin at lower parts of the range.

As explained, the arrangement of the electronic oscillator for control by observation of dew conditions and for control of such conditions by induction heating effect, constitutes an essentially immediate and thus relatively high speed servo loop, the desirable rapidity of response being achieved by direct utilization of the output of the phototube means by a bridge or other arrangement, for biasing the electronic oscillator, but nevertheless giving rise to the inaccuracies mentioned above. It has heretofore been proposed to include a slower servo loop functioning for supplemental control of the oscillator bias in accordance with changes of equilibrium demand for heating current, the specific previous proposal being to adjust a supplemental biasing potentiometer or so-called threshold control by an appropriate motor or the like which is set in operation when the demodulated product of the phototube output reaches either limit of a predetermined range.

Thus an electromagnetic relay, for example, functioning as a voltmeter across a portion of the demodulator load is arranged to close one or another of two sets of motor control contacts when the voltage across such portion reaches one or another of two limiting values, the motor then functioning in one direction or the other to adjust the oscillator bias and correspondingly change the oscillator output by a certain amount, i. e. until the demodulator output is again within the selected range. As will be seen, this arrangement provides an automatic sort of threshold control, tending to keep the dew thickness or amount within a certain small range for all values of dewpoint, the necessary adjustment of oscillator output for a change in equilibrium conditions being thus effected by supplemental means, so that a more or less constant dew thickness is achieved and, within certain limitations (of result as well as of means), somewhat better accuracy is reached.

In utilizing apparatus of the foregoing type, one procedure for initial balance of the phototubes is to modify the circuit temporarily so that dew-clearing heat is supplied to the mirror by the oscillator; at the same time, by means such as a shutter between the lamp and the phototube which received light directly from it or by electrical means in the phototube voltage supply system (such as a potentiometer in the phototube bridge), the optical-photoelectric assembly is brought to a condition of balance represented by zero output of the demodulator, the oscillator bias control by the demodulator being temporarily interrupted. Then if the threshold control of the oscillator, as by supplemental manually adjusted bias means, has been or is now set to provide a certain small oscillator current for zero demodulator output, the apparatus may be restored to provide control of increase or decrease in oscillator bias from the demodulator, and will thereafter function automatically to maintain approximately the desired extent of dew on the mirror surface. That is to say, as the mirror then cools and dew forms, the increase in demodulator output increases the oscillator output until (at more or less the desired dew thickness) the heat from the oscillator balances the heat losses of the mirror at or close to the dew-point temperature.

Since accumulations of dust or the like from the supplied air, indeed even invisible or difficultly visible accumulations, may affect the accuracy of dew-point determination by falsely simulating dew or falsely constituting a part of the appearance of dew, it is often desirable to rebalance the apparatus at suitable intervals, such as every twenty minutes, or half hour or so. It also is sometimes necessary, especially if there is no automatic or otherwise frequent adjustment of servo threshold, to clear the mirror occasionally of excessive dew, i. e. liquid or frost, accumulations which may cause false optical response as indicated above. Cycling means have been suggested for accomplishing one or another of such results automatically, although such means have been only incompletely or inefficiently realized; for example, prior proposals appear to have required at least a series of operations or some supplemental manual adjustment in order to effectuate the desired results.

For the relay-type automatic threshold control described above for preventing unusually thick dew at high dew-points or ineffectively thin deposits at low dew-points, some control has also been proposed (as by a rheostat in series with the relay coil) for adjusting the limits or range of response of the threshold control. However, such control has not been very satisfactory, and the system cannot provide a truly high accuracy of dew thickness control, for corresponding precision of dew-point response. In another dew-point hygrometer system of the type described above but lacking any automatic threshold regulation whatever, there has only been manual adjustment of the direct-light shutter, which provides a type of threshold adjustment but no true control of dew thickness.

Important objects of the present invention are to afford new and improved apparatus of the character described, particularly apparatus affording a continuous, highly accurate and highly reproducible detection of dew-point, over a very wide range and with appropriate, automatic adjustment or compensation to avoid errors such as would be occasioned by change in the amount of dew at equilibrium. Specific objects are to provide new and improved optical-photoelectric systems for establishing an electrical output in accordance with the characteristics of the observed dew-forming element, and particularly to provide an alternating output, preferably of substantially sine-wave character; to provide novel and more accurately effective arrangements for automatic threshold control of an electrically continuously operative nature, having efficiency and accuracy to which the improved photoelectric arrangement contributes; and to afford new and improved means of both manual and automatic character for re-balancing the system and for adjusting the thickness or amount of dew to be maintained at equilibrium.

Still further objects include the provision, in dew-point hygrometers, of electrical and electronic arrangements affording more accurate and reliable response, in a variety of ways, as well as a notably convenient and easily operated control system whereby necessary manual and other adjustments and calibrating functions are readily performed. A specific object is to provide electrical dew-point hygrometer apparatus wherein alternating current of a single, externally supplied character may be employed throughout, both as a basis for signaling and as a source of energy for actuation and control of adjusting motors or the like, the entire system being improved and more efficient in a variety of significant respects.

To these and other ends, certain presently preferred embodiments of the invention are shown in the accompanying drawings and described below, by way of illustrative disclosure of the features and principles of improvement.

Referring to the drawings.

Figure 1:
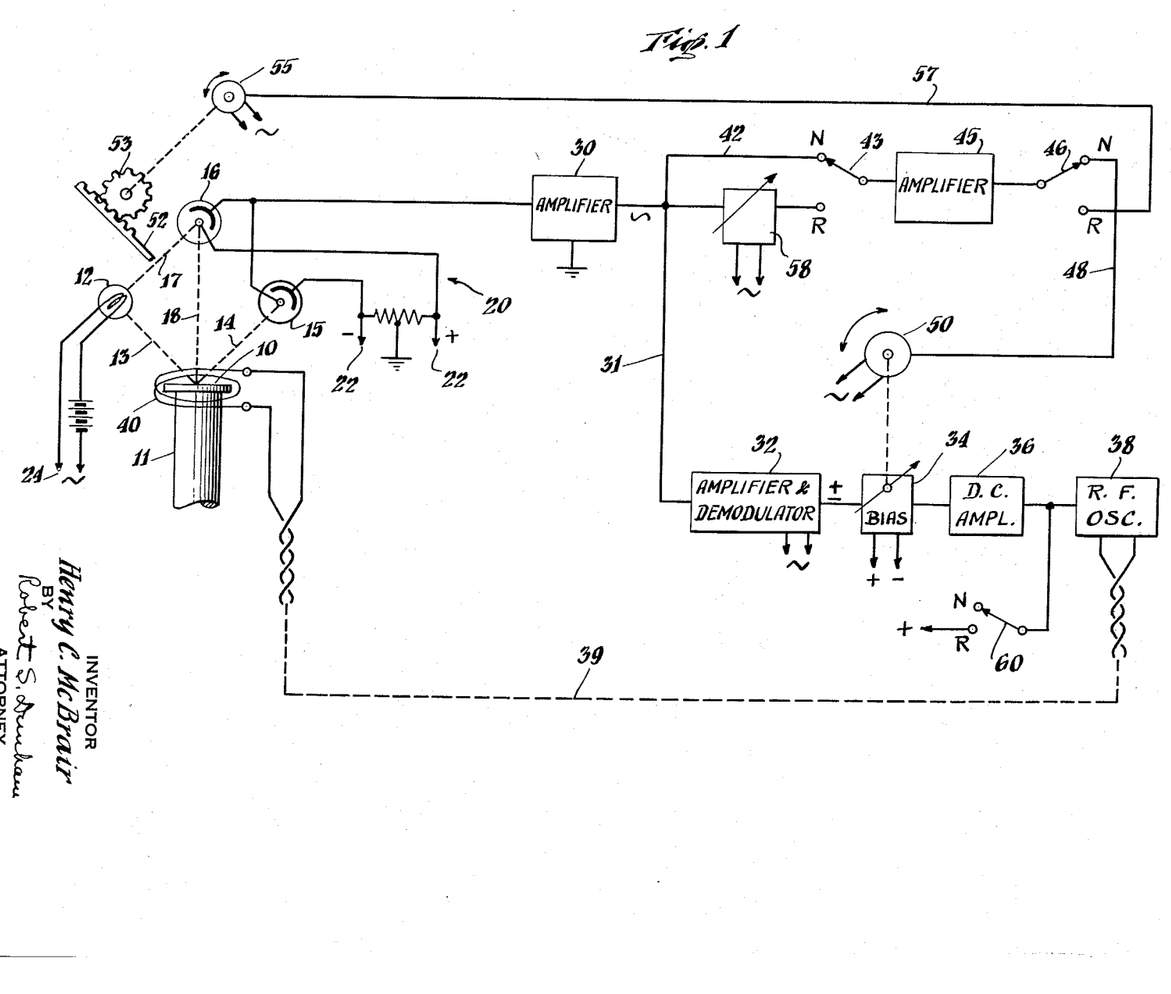
Fig. 1 is a simplified block-type diagram showing the combination of certain fundamental elements, in one example of an automatic dew-point hygrometer according to the invention.

As schematically shown in Fig. 1, the apparatus includes a mirror 10 arranged for exposure to the air or other gas under observation as to dew-point, for instance air supplied in a continuous stream over the upwardly facing mirror surface. The mirror, made of metal, is cooled conductively through a supporting rod 11 extending to suitable cooling means, not shown, which may be a mechanical refrigerating device, or a bath of alcohol containing lumps of dry ice, or the like. An electric lamp 12 directs a beam of light 13 angularly toward the mirror, which specularly reflects the beam at 14 to a photocell or tube 15, another photocell or tube 16 being arranged to receive a beam of light 17 directly from the lamp, and also if desired, although not necessarily, a beam or column of light 18 diffusely reflected by the mirror 10, e. g. when the latter has a covering of dew. Thus the illumination of the photocell 15 varies inversely with the amount of dew on the mirror surface 10, while the light on the direct beam photocell 16 may also vary in the opposite sense by reason of the beam 18, increasing or decreasing with the dew deposit. In an arrangement where the cell 16 only observes the direct beam 17, it is unaffected by the condition of the mirror surface, but in either event there is a differential illumination of the phototubes which varies with the amount of dew or its absence.

In accordance with the present invention, the phototubes are connected in opposing legs of a direct current bridge circuit generally designated 20, and are in effect arranged in series (as shown) across a source of direct current 22. Whereas in prior dew-point hygrometers an alternating output from a pair of differently illuminating photocells has been achieved by interrupter-type modulating means or by inserting alternating or pulsating voltage in the photocell circuits, the production of a modulated signal in the present apparatus is very advantageously achieved by undulating or pulsating modulation of the light source 12, for example by energizing this lamp with alternating current 24. For many purposes ordinary 60 cycle current is suitable, it being preferable to supply such energization as a pulsating direct current (e. g. by connecting a constant-voltage A. C. source in series with a suitable D. C. source 25) so that the frequency doubling effect of the lamp on pure A. C. will be obviated and there will be only one peak of illumination per cycle. This arrangement is desirable where the same 60 cycle supply is used elsewhere in the system, as described below, for certain phase-controlled functions, i. e. relative to the signal from the photocell bridge 20.

While the signal resulting from such modulation of a small, fast-heating incandescent lamp (e. g. a 6-volt bulb) is dissymetrical, it is near enough sinusoidal for reasonably good results in the system shown; an improved modulated lamp device, however, will be described in connection with Figs. 2A and 2B.

An A. C. (audio frequency) amplifier 30 is connected to the output of the photocell bridge 20, and when the latter is unbalanced, receives an alternating current signal which is governed in amplitude by the extent of unbalance and in phase by the direction of unbalance. Through a path indicated at 31 the amplified unbalance signal from the electronic amplifier 30 continues along the high speed servo loop which includes an electronic amplifier and demodulator 32, delivering a D. C. output which is combined with a supplemental D. C. voltage in the bias or threshhold control device 34, all for varying the bias of a D. C. amplifier 36 which in turn controls the bias and thus the magnitude of output of a radio frequency oscillator 38. The continuous oscillation produced by the oscillator 38 at a suitable radio frequency, for example 1500 kilocycles, is supplied via a transmission line 39 to a heating coil 40 which surrounds the mirror 10 and supplies heat energy to the latter, e. g. by induction heating. It may be explained that the section 32 of this high speed servo loop not only further amplifies the unbalance signal but demodulates it against a separately applied alternating voltage so as to feed a D. C. signal to the bias and threshold control 34, such signal having a magnitude governed by the amount of photocell unbalance and having a polarity determined by the direction of unbalance.

As will now be understood, when the cooling action, i. e. heat withdrawal, through the column 11 lowers the temperature of the mirror 10 to the vicinity of dew-point of air above the mirror, dew commences to form and upon its exceeding a thickness corresponding to a predetermined balance of the phototubes, a corresponding alternating signal appears in the input of amplifier 30. In such case, the signal represents predetermined decrease of illumination of the phototube 15 (and increased illumination of tube 16), and as will now be understood, the phase and polarity relationships throughout the described high speed loop 30–40 inclusive are such that the bias of the oscillator 38 is correspondingly changed in a direction to increase the amplitude of oscillation and thus to supply more heat to the mirror. The resulting increase of mirror temperature rapidly eliminates the unbalance of the servo loop, bringing the latter to an equilibrium condition with a certain dew thickness, so that measurement of the temperature of the mirror surface (by means not shown in Fig. 1) provides a reading of the dew-point.

If the dew-point falls, the mirror surface tends to become clear of dew and an unbalance in an opposite direction arises, i. e. with greater light falling on the specular reflection-phototube 15. The high speed servo loop functions in the reverse direction, reducing the output of the oscillator 38 and reducing the heating effect of the coil 30 until the mirror temperature drops to the actual dew-point and balance is restored, again with a certain dew thickness.

Depending on the original (e. g. manual) setting of the bias on the amplifier 36 or the oscillator 38, to which the D. C. bias signal from demodulator 32 is algebraically added, the described servo loop can come to balance at any selected condition of the bridge 20, i. e. at zero (balanced bridge) signal or some unbalance signal in one direction or the other. It is particularly advantageous (though perhaps not necessary in all cases) to have the servo loop balance at zero bridge signal, and to have the latter represent a predetermined amount of dew on the mirror 10. But as has been explained, this loop can by itself only so balance (i. e. come to equilibrium) at one temperature; at all other dew-point temperatures there would have to be a bridge unbalance signal in the correct direction and amount to maintain greater or less power output of the oscillator 38 for equilibrium of the loop.

To obviate the difficulty just described, the apparatus includes a so-called automatic threshold control, which maintains a constant dew thickness over a wide range of dew-points and thus avoids the inaccuracies caused by excessively thick dew at high temperatures and objectionably thin deposits at very low temperatures. In accordance with the present invention, this automatic control is effected by a continuously operating servo loop (rather than relay or stepwise operated loop) which is very considerably slower in response than the high speed loop described above. The slow speed loop includes the optical system and the photocell bridge 20, as well as the amplifier stage 30, and also includes the D. C. amplifier 36, oscillator 38 and heating coil 40. In this servo loop, however, an output signal from the amplifier 30 is directed through the path 42 and a switch 43 in its normal operating position N, to a further A. C. amplifier 45. The output of the amplifier 45, through a switch 46 in its operating position N, is delivered through the path 48 to control a reversible motor 50, which adjusts the supplemental bias applied in the device 34 for cooperation with the D. C. bias signal, if any, in the output of the demodulator 32. The net resulting bias controls the D. C. amplifier 36 and through the latter, the R. F. oscillator 38.

Since the motor 50 is also directly energized by alternating current of the same frequency as the modulation of the lamp 12, the direction of rotation of the motor and thus the direction of change in the supplemental bias of the threshold control 34 is determined by the phase of the stepped-up unbalance signal in the output of the amplifier 45. The phase of the latter signal is, of course, determined by the direction of the original unbalance signal in the output of the photocell bridge 20, the phase relationships in the motor 50 and the polarity of the adjustable bias device or potentiometer 34 being such that an increase of dew thickness tends, through this slow speed loop, to increase the amplitude of oscillation produced by the oscillator 38, and vice versa. At the same time, the interposition of the motor 50 and its mechanical connection to the threshold control device 34 necessarily introduces considerable delay in this servo loop, i. e. relative to the extremely rapid response of the fully electrical loop through the amplifier and demodulator 32. As a result, the high speed loop adjusts promptly and independently of the slow speed threshold control loop, and the latter thereafter functions to modify the bias of the D. C. amplifier 36 and R. F. oscillator 38 for maintenance of the necessary equilibrium output of the oscillator but with the photocell bridge 20 restored to its original, desired condition, e. g. the condition of true balance representative of a selected dew thickness. The high speed loop continuously accommodates itself, so to speak, to the adjustments of the slow speed loop; for instance, when the motor 50 adjusts the value of supplemental bias provided by the threshold control device 34, there is a corresponding, opposite change in the bias derived from the demodulator 32, indeed (in the preferred circuit shown) a change (downward or upward) to zero D. C. output from the demodulator. The net result is that the oscillator output is exactly that which is necessary to maintain the desired, selected dew thickness at the mirror surface.

Stated in another way, the function of the slow speed loop is to cause the high speed loop to balance not merely at a condition of its own equilibrium but specifically with the phototube bridge in a constant condition, e. g. a condition of zero output representing true bridge balance. While in some cases the slow servo loop can be arranged to balance on a specific value of bridge output signal, special convenience and reliability are achieved by design of the system (as shown and described) to balance on zero signal from the phototube bridge; thus very simply, when the bridge is balanced the signal in the amplifier 45 disappears and the motor 50 stops. In any case the automatic threshold control (slow speed) loop effectively serves its chief function of providing for the differences in continuous R. F. oscillator output that are required at equilibrium (of the high speed loop) for various dew-point temperatures. In consequence the dew thickness on the mirror 10 may remain truly the same at all dew-points over a very wide range and need not vary in order to accommodate or maintain the different R. F. heating requirements for equilibrium at the several temperatures.

In order to correct for even minute accumulations of dust on the mirror surface or to correct for puddling of dew which may occur over a relatively long interval despite the corrective action of the slow speed servo loop, it is desirable to clear the mirror and re-balance the system at suitable intervals. For original balance as well as for re-balancing, the apparatus of Fig. 1 includes a shutter 52 movable to adjust the size or intensity of the direct light beam 17 from the lamp 12 to the photocell 16. The shutter 52 is driven, through suitable mechanism 53, by a reversible alternating current motor 55. The motor 55 is phase-controlled, for drive in one direction or the other, by alternating current supplied in the path 57 from the output of amplifier 45 when the switch 46 is in its re-balancing position R. For balancing operation the switch 43 is also moved to a corresponding position R, so that as schematically indicated, the signal from amplifier 30 is supplemented by a selected alternating voltage introduced in the shutter-positioning loop by a device 58 which is adjustable to effect change in dew thickness.

When the system is to be re-balanced (or indeed, originally balanced) a further switch 60 is also thrown from its normal position N to position R whereby a high positive bias is applied to the R. F. oscillator 38. With high energy thus supplied to the heating coil 40 the mirror 10 is brought well above the dew point, rapidly clearing it of dew. The re-balancing loop comprising the photocell bridge 20, amplifier 30, thickness control device 58, amplifier 45, motor 55 and shutter 52 then functions to drive the shutter to a new position (if necessary) representative of a desired state of balance of the photocell bridge 20. In this way the system automatically compensates for accumulation of dust or dirt on the mirror surface which might otherwise, i. e. in normal operation, contribute to a false reading of dew.

Lacking the supplemental signal inserted by the device 58, the re-balancing loop would position the shutter, i. e. would bring the motor 55 to rest, with the photocell bridge output in actual, complete balance, giving a zero signal for a clear mirror. In normal operation, however, the photocell bridge output should be zero not when the mirror is clear but when a predetermined amount, e. g. thickness, of dew is present. Hence the device 58 injects a further signal into the re-balancing loop, of appropriate phase and of adjusted value such as to oppose exactly the signal which the bridge should yield on a clear mirror in order to reach bridge balance (zero signal) for a selected dew thickness in subsequent normal operation. In other words, the shutter 52 is positioned so that the algebraic sum of the bridge output signal and the injected signal is zero. In consequence, the phototube bridge will thereafter produce a given signal (in heat-reducing direction) for a clear mirror, which signal cannot be brought to zero until there is a certain amount of dew. Since the value of the residual bridge signal thus left from the re-balancing operation is determinable by adjustment of the device 58, the latter affords a very accurate control of dew thickness, namely the amount of dew deposit which is to be thereafter achieved at any equilibrium condition in normal operation.

Following a re-balancing step, the switches 43, 46 and 60 are restored to their positions N and the normal use of the apparatus then continues, the shutter 52 having been re-positioned to whatever extent may have been necessary for proper response to dew deposit as distinguished from other deposits or conditions which might affect the mutual response of the photocells 15, 16. As will be explained in connection with Figs. 2A and 2B, the re-balancing step may be accomplished automatically by suitable cycling mechanism which periodically shifts certain switching means corresponding to the devices 43, 46 and 60, say for a thirty second re-balancing period every 20 minutes.

Figure 2A:
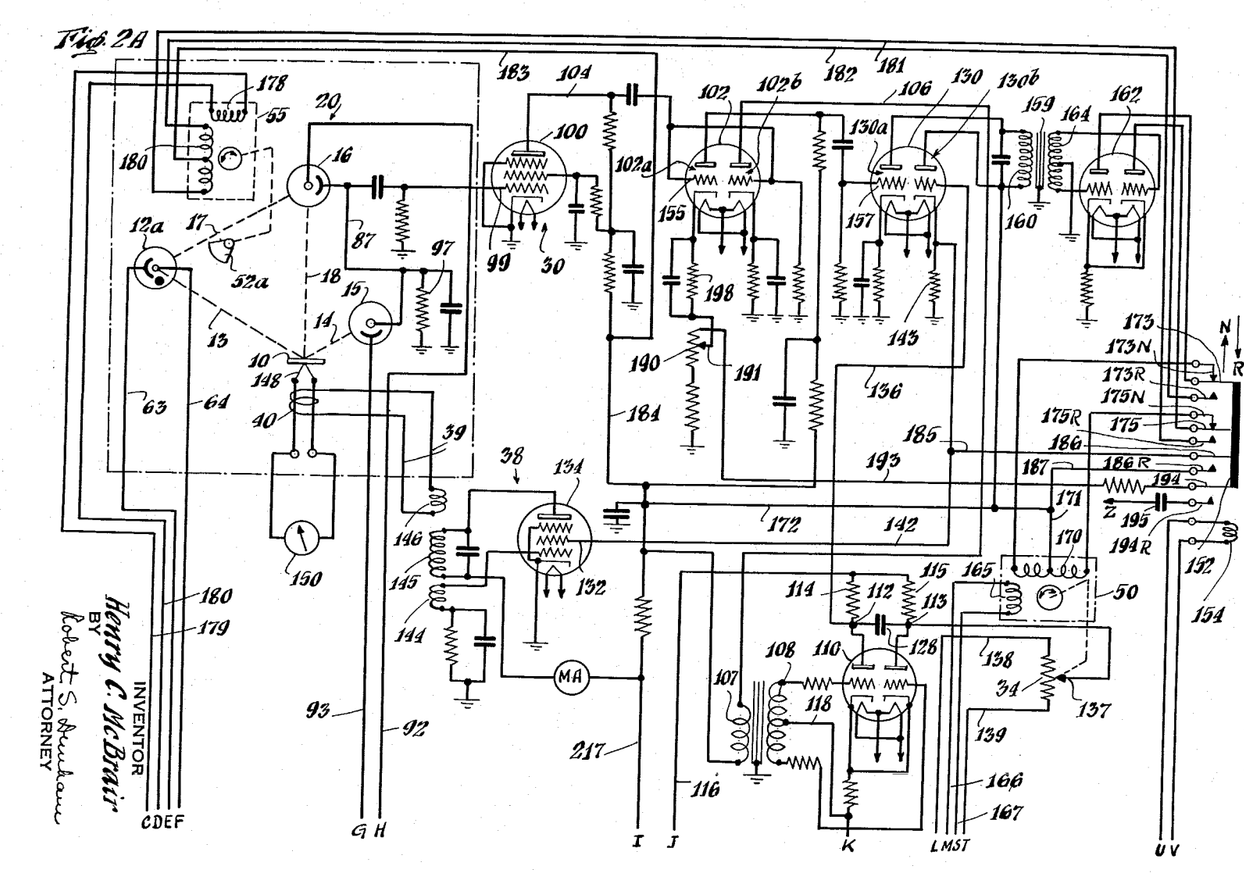
Figs. 2A and 2B, arranged to be joined to constitute a single view, show an essentially complete wiring diagram of the apparatus of Fig. 1, including further features of automatic control.
Figure 2B:
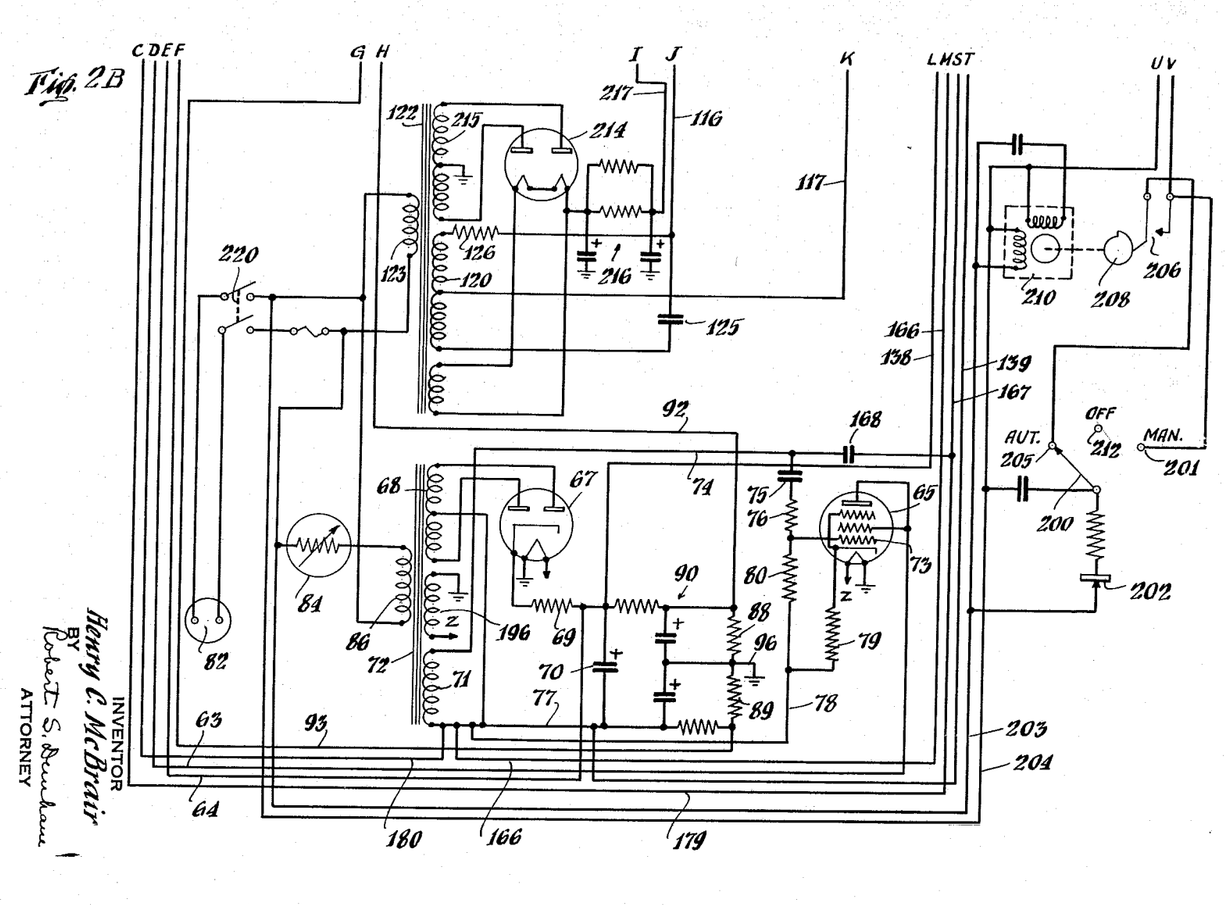

Figs. 2A and 2B are a detailed wiring diagram of one example of apparatus embodying the present invention and including various features schematically depicted in Fig. 1. Figs. 2A and 2B may be joined to represent a single view, i. e. with direct connection of the conductors at the corresponding points that are identified as C to M inclusive and S to V inclusive at the bottom of Fig. 2A and top of Fig. 2B. It will be understood that to some extent (although not in all cases), parts in Figs. 2A and 2B identical with parts in Fig. 1 have been similarly numbered. Some further, specific features of improvement are also illustrated in these figures, as well as more detailed illustration of various circuit components. While for the sake of illustrative example, Figs. 2A and 2B are shown and described as having a number of amplifier and other circuit connections and arrangements of a specific character now believed desirable, and as including specific tube types, arrangements of power supply, and certain voltage and other electrical control instrumentalities, alternative or equivalent means may in many cases be employed as will be readily apparent to those skilled in the art.

In Fig. 2A the mirror 10 (which has cooling means such as shown at 11 in Fig. 1 but here omitted for simplicity of illustration) is illuminated by a light beam at an acute angle, from a lamp 12a, which instead of an incandescent lamp is preferably a so-called glow tube modulator, e. g. a gas-filled discharge-type tube such as Sylvania No. R–1131-C, that affords an approximately pin-point source of light and that responds practically instantaneously to changes of energizing current, for cooperation to provide a better wave form in the pulsating illumination of the phototubes 15 and 16, the latter being optically arranged in the same way as in Fig. 1.

Through conductors 63, 64, the lamp 12a is connected for energization in and by the anode circuit of an amplifier tube 65, which may be a pentode such as type 6AQ5 connected and used as a triode, as shown. Power supply for the tube 65 is derived from a full wave rectifier tube 67, that is in turn supplied from a center tapped secondary 68 of a power transformer, the connections of the rectifier being conventional and providing a D. C. output, in series with the lamp 12a in the anode circuit of the tube 65, which is filtered by the resistor 69 and capacitor 70. From another suitable winding 71 on the same power transformer 72, say providing an output of 115 volts, an alternating voltage is applied to the grid circuit of the amplifier tube 65, the secondary 71 being connected to the grid 73 of the tube via conductor 74, condenser 75, and resistor 76, the other side of the secondary 71 being connected to the negative line 77 of the anode power supply and thus through the conductor 78 to the negative end of a cathode resistor 79. Through such coupling, alternating voltage from the secondary 71 is developed across the grid resistor 80 of the tube.

In the circuit shown and with appropriate choice of values (as will be readily understood) for components governing such characteristic, the amplifier can be made strongly regenerative. In consequence, the current through the modulator lamp or tube 12a varies linearly with the voltage applied to the grid 73 of the tube and thus may have a substantially pure sine wave form in agreement with the true alternating current wave supplied by the secondary 71. It will also be noted that the resistors 76 and 80 and the condenser 75 may be selected or adjusted to predetermine both the percentage modulation and the phase of the light signal, and thus of the signal voltage developed by the phototube bridge. Specifically, with the arrangement shown, modulation approaching 100% may be obtained, with a substantially pure sine wave in the pulsating illumination from the lamp, and hence in the phototube bridge signal.

Other advantages of this specific light source arrangement (in addition to improved accuracy by reason of better wave form) include the ease of control of the modulator lamp and particularly the possibility of making phase shift adjustments, if necessary, in the modulating system just described, instead of in the amplifying or demodulating section (described below) of the high speed servo loop. By energization with the unidirectional current in the anode circuit tube 65, the lamp 12a is, of course, characterized by only one sinusoidal increase and only one sinusoidal decrease of illumination per cycle, with the same effect as the arrangement of current supply for the lamp 12 in Fig. 1.

If desired, the intensity of the lamp 12a may be made essentially independent of line supply voltage fluctuations by inclusion of a suitable voltage regulating device, for example a conventional Amperite voltage regulator 84 inserted in one of the leads connecting the primary 86 of the transformer 72 with the supply line 82.

While one embodiment of the system shown in Figs. 2A and 2B was primarily designed for energization from an alternating current source (connected at 82) having a frequency of 400 cycles such as is available in certain air-borne installations, it will be understood that the same circuit may be used with other A. C. supplies, such as the usual 60 cycle current, and that various components, as in filtering or other circuits, are appropriately chosen in each case to suit the selected frequency and voltage of current supply.

The phototube bridge circuit 20 comprises the phototubes 15 and 16, each for example a type 926 vacuum phototube, connected in adjacent legs of the bridge with the cathode of tube 16 connected to the anode of tube 15 by the conductor 87, while the other legs of the bridge constitute the resistors 88, 89 (Fig. 2B) connected in series across the D. C. output of the full wave rectifier 67, as further filtered at 90. The opposite ends of the D. C. voltage supply thus provided across the resistors 88, 89 are connected by conductors 92 and 93 respectively to the anode of the tube 16 and cathode of the tube 15. The output of the bridge, which provides an alternating current signal only upon unbalance between the voltage drops across the phototubes, is taken from the conductor 87 and the grounded mid-point 96 between the resistors 88 and 89. The A. C. signal thus appears across a load resistor 97 which is appropriately coupled, as shown, to the grid 99 of a voltage amplifier tube 100 which corresponds to the amplifier 30 in Fig. 1. Conveniently, the tube 100 is a remote cut-off pentode, such as type 6BA6, arranged as shown to constitute a signal amplifier and grid limiter. By grid limiting (resulting from the remote cut-off characteristics), distortion is avoided such as might occur on large signals reaching limiting or saturated conditions in the plate circuit. Plate-limited signals might acquire false characteristics of phase which could cause false or improper operation of the servo loops.

For the amplifier and demodulator section 32 of the fast servo loop (Fig. 1), the present system includes the right-hand half 102b of a twin triode 102 (such as a type 12AU7), arranged as an amplifier receiving the phototube bridge signal from the anode circuit 104 of the tube 100 (resistance coupled to the tube section 102b) and delivering a further amplified signal (in plate circuit 106) to the primary 107 of a coupling transformer having its push-pull output winding 108 connected to the grids of a twin triode vacuum tube 110 (such as a type 12AU7) arranged to constitute a balanced demodulator. The demodulator tube 110 has its plates connected to the outer ends 112, 113 of a pair of load resistors 114, 115 which are connected together at their other ends to one side 116 of an A. C. source, the other side 117 of the latter being returned to the cathodes of the tube 110, which also complete the grid circuits by connection 118 through the center tap of the coupling transformer secondary 108.

The alternating current source connected to the lines 116, 117, may conveniently be a center tapped winding 120 on a further power supply transformer 122 which has its primary 123 supplied from the same A. C. source 82 that furnishes the alternating current wave of the lamp 12a. By connections of the lines 116, 117, to the secondary 120 as shown, with the further connections of capacitor 125 and resistor 126 to constitute a phase-controlling network, a desired phase relation of the A. C. in the lines 116, 117 may be established relative to the current supply 82 and thus to the phototube bridge signal. While critical adjustment, if necessary, of the mutual phase relationships of the A. C. in lines 116, 117 and of the phototube bridge signals may be effected with the network last described, it may also be more conveniently effected, or pre-selected in most cases, with the components in the input of the lamp control amplifier 65 as explained hereinabove.

The tube 110 is thus connected to constitute a balanced demodulator which detects the varying amplitude A. C. signal from the phototube bridge against alternating current from the same original source, so as to produce a D. C. voltage between points 112 and 113 which has a polarity and amplitude that are controlled by the phase and amplitude of the signal. Since the plate voltage on both sections of tube 110 is alternating (i. e. pulsating) and since the signal voltage is impressed on the respective grids 180° out of phase with each other, plate current will flow during one-half cycle only, and the D. C. output polarity between the points 112 and 113 will depend on which section of the tube draws the larger current during such time.

The voltage output from the demodulator, smoothed by the filter condenser 128, is added algebraically to the output voltage of a potentiometer 34 (being the bias control so identified in Fig. 1) for control of the bias on the grid of a D. C. amplifier, which is constituted by the right-hand half 130b of a twin triode 130, for example a type 12AU7 vacuum tube. The triode 130b is arranged as a cathode follower, for controlling the voltage (sometimes herein conveniently referred to as bias) on the screen grid 132 of the oscillator tube 134, and thus in effect for controlling the R. F. heating current supplied to the coil 40 around the mirror 10. The cathode follower 130b which thus constitutes the D. C. amplifier 36 of Fig 1, functions as an impedance changing device for efficient and accurate control of the oscillator screen voltage. Thus the grid circuit of the triode 130b extends from the grid through conductor 136, resistors 114 and 115 in series (providing the D. C. output of the demodulator) and then through the output of the potentiometer 34 to ground.

It will be noted that the point 113 is connected to the movable arm 137 of the potentiometer, which is arranged in a bridge circuit including resistors 38 and 39 so that a phantom ground is applied at the center of the potentiometer. Specifically the terminals of the potentiometer resistance extend through conductors 138, 139 to opposite sides of the center-grounded D. C. output of the rectifier 67, as filtered by the elements 69 and 70. Thus the grid circuit of the cathode follower 130b is returned to ground via the described bridge circuit, the movable arm of the potentiometer being connected to point 113. In this way positive or negative bias can be derived from the potentiometer 34 in accordance with the requirements of the system, while the demodulator 110 is itself isolated from ground, to permit addition of its output (likewise of either polarity) in the grid circuit of the tube section 130b as described above.

The R. F. oscillator 38 here comprises the tube 134, for instance a type 6L6 beam power amplifier, having the voltage on its screen 132 derived by connection through conductor 142 to the positive (cathode) side of the cathode resistor 143 of the cathode follower triode 130b, so that as such voltage varies from near zero to a maximum, the oscillator output correspondingly changes. Although other circuits may be used, the tube 134 is conveniently connected as a so-called reversed feed back type of radio frequency oscillator, having coupled grid and plate coils 144, 145, which are also coupled to an output coil 146 that extends via transmission line 39 to the mirror heating coil 40. The R. F. output of the oscillator 38 may be of any desired frequency appropriate for rapid heating of the mirror 10; in one instance the illustrated oscillator circuit was designed to supply current at 1.3 megacycles, which was very satisfactory in heating a small stainless steel mirror 10 having a diameter of 5/32 inch.

The high speed servo loop which has now been described functions in precisely the manner set forth relative to Fig. 1. For instance, upon change of dew condition on the surface of the mirror 10, a signal change in one direction or the other is developed in the output of the phototube bridge 20. If the bias control potentiometer is in a proper state of adjustment, the bridge output will have been zero and the described change will be to a definite signal of one phase or the other (differing by 180°). In any event, the effect of the signal or change of signal in the bridge output, as amplified by elements 100 and 102b and demodulated in the tube 110, is to alter the bias of the cathode follower 130b and consequently the R. F. output of the oscillator 38. In consequence greater or less heat is developed in the mirror 10 and the servo loop comes to a new balance of the heating and cooling influences on the mirror, in accordance with the change of dew-point which initiated the described train of events. Balance is thus restored with a different temperature of the mirror surface, which now again represents a predetermined dew condition, and which may be read to indicate the new dew-point. The response of this all-electrical servo loop is extremely rapid, affording essentially instantaneous adjustment of mirror temperature in response to each small change of dew-point in the air or other gas to which the mirror is exposed.

Various means may be employed for measuring the mirror temperature, for example a thermocouple 148 connected to an indicating or recording instrument which may be of any type suitably sensitive for response to such thermocouple and which is here schematically indicated at 150.

The actual amount of dew established upon a balanced condition of the high speed loop corresponding to a given dew point temperature will depend on the setting of the potentiometer 34, which is therefore conveniently termed the threshold control. While in some cases such control may be manually adjusted or may be supplemented by a manual adjustment, the present apparatus advantageously provides an automatic adjustment of this bias device through a slow servo loop as explained in connection with Fig. 1.

For normal operation the slow speed loop is maintained in operative relation by a relay switch assembly 152 in its normal position N corresponding to deenergized condition of its controlling relay winding 154. In this servo loop there are a pair of voltage amplifiers connected in cascade and respectively comprising the other triode sections 102a and 130a of the tubes 102, 130. As shown, the output coupling of the first signal amplifier stage 130 leads to the grid 155 of the triode 102a, as well as to the grid of the triode 102b (in the high speed loop), while the plate of the triode 102a is resistance coupled to the grid 157 of the triode 130a. The plate circuit of the amplifier 130a extends to a coupling transformer 159 having its primary 160 (in such circuit) tuned for maximum gain at the fundamental signal frequency, e. g. 400 cycles in the specific system described. The final stage of amplification in this loop involves the twin triode 162, e. g. type 12AU7, arranged in push-pull with its grids connected to the ends of the center tapped secondary 164 of the transformer 159.

The movable arm 137 of the potentiometer 34 is driven in one direction or the other by the reversible motor 50 having one winding 165 energized from the modulation-control A. C. supply secondary 71, through conductor 166 and conductor 167 and a condenser 168. The motor 50 also has a control winding 170 with a center tap returned via conductors 171 and 172 to the positive side of the plate supply (described below) of the tube 162, the opposite ends of the winding 170 being connected to the plates of the tube 162 respectively via fixed contact 173N and 175N normally engaging the corresponding movable contacts 173, 175 of the switch assembly 152.

It will be seen that the amplifier composed of tubes 102a, 130a and 162 constitutes the amplifier 45 of Fig. 1, completing the servo loop for adjustment of the motor 50 and the threshold control 34 in the precise fashion described above relative to Fig. 1. That is to say, the motor 50, under control of the signal from the phototube bridge 20, adjusts the potentiometer 34 so as to provide a suitable bias voltage about which the demodulator 110 can effectively operate for instantaneous response in the high speed loop. The ultimate function and effect of the slow speed loop is to provide for equilibrium of the system at the same predetermined dew thickness, or amount of dew, throughout a wide range of dew-point temperatures.

It will be noted that this supplemental servo circuit advantageously exerts a control of the R. F. output of the oscillator 38 which is basically independent of light level and which conforms automatically to any dew thickness operating point that may have been selected as by means 58 in Fig. 1.

Whereas equilibrium of the high speed loop is governed by attainment of a steadiness in the phototube bridge output (whether at zero or some definite signal), the slow speed loop always (and only) comes to rest when the alternating current in motor winding 170 is zero and thus when the phototube bridge output has a specific predetermined character, e. g. zero signal. Hence the effect of the supplemental loop is to insure that the high speed loop achieves steadiness of bridge output at the same point (e. g. zero signal) for all temperatures. In the system shown, the heating-and-cooling balance of the high speed loop is then always reached, with reasonable accuracy, at the point of balance of the phototube bridge.

Because of the motor 50 and its mechanical operation of the potentiometer 34, the supplemental loop is relatively slow in response; in practical effect it leaves the potentiometer in a given position until some large unbalance occurs. At the same time, the primary or controlling servo loop responds many times more rapidly (for example to provide a mirror temperature change of about 30° C. per second) and any given change has a greater effect on the balance of the primary loop, so that the net result is a proper and unimpaired response of the primary loop at all times, yet with maintenance of a highly constant dew thickness regardless of dew-point temperature.

For original and periodic balancing the system of Figs. 2A and 2B also includes means as indicated in Fig. 1, for adjustment of a shutter 52a that controls the amount of light received by the phototube 16, e. g. directly traveling in the path 17 from the lamp 12a. The reversible motor 55 that positions the shutter has an energizing winding 178, supplied with A. C. from the secondary 71, via conductors 179, 180 in parallel with the conductors 167, 166. The motor also has a control winding 180 with its outer ends connected to the normally dead stationary contacts 173R and 175R of the switch assembly 152, via conductors 181 and 182 respectively. The motor winding 180 also has a center tap which is connected via conductors 183 and 184 to the positive side of the plate voltage supply (described below) of the tube 162. Thus upon energization of the relay coil 154 and corresponding shift of the movable contacts 173, 175 away from contacts 173N, 175N and into engagement with contacts 173R, 175R, the control winding 180 is appropriately connected to the push-pull outlet of amplifier tube 162, in place of the winding 170 of the motor 150.

To clear the mirror during intervals of balancing or re-balancing, a high or full R. F. output is applied to the coil 40 by corresponding application of high positive voltage to the oscillator screen grid 132. For such purpose, the grid 132 is connected via conductors 142 and 185 to the movable contact 186 of switch assembly 152, that is in turn adapted to be closed against stationary contact 186R when the relay is energized and the assembly 152 is shifted from position N to position R. With contacts 186, 186R closed, high positive voltage is supplied through them via conductors 172 and 187. During ordinary operation with relay 154 deenergized, these contacts are open and the oscillator grid 132 is supplied only from the output of the cathode follower 130b.

As explained above for Fig. 1, it is desirable, both for proper operation of the apparatus as a truly null system, and also to afford a convenient control or selection of the desired dew thickness, to insert a predetermined supplemental signal in the re-balancing loop, such that with the mirror clear, the shutter 52a comes to rest at a corresponding, definite, opposing signal output of the phototube bridge. The injected signal is, in use, so selected that the bridge (in normal operation) will reach zero output at a desired dew thickness, from which the last-mentioned bridge signal represents the extent of departure to a clear mirror condition.

Corresponding to the device 58 of Fig. 1, a potentiometer 190 is included in the common grid and cathode return line of the amplifier stage 102a (i. e. the input of the amplifier 45, Fig. 1), and has an adjustable arm 191 for changing the amount (voltage) of signal thereby injected. To provide alternating voltage across the potentiometer 190 its ungrounded end extends via conductor 193 to movable contact 194 of the switch assembly 152, which engages stationary contact 194R only when the relay 154 is energized. The latter contact is connected through a phase-adjusting condenser 195, via a conductor omitted but indicated at Z, Z, to one side of a winding 196 on the transformer 72, the other side of the winding being returned to the potentiometer 90 via ground. Thus when the switch assembly 152 is moved to position R, an A. C. signal is inserted in the amplifier which controls the motor 55, such signal being of proper phase for opposing the kind of signal desired from the phototube bridge as representative of a clear mirror, and the value of the injected signal being selected (by manual adjustment of arm 191) to correspond with a desired dew thickness as explained above. During normal operation, when contacts 194, 194R are open, the potentiometer 190 is deenergized, so that no signal is then injected and the phototube bridge will come to balance, i. e. zero signal output, only upon presence of the selected amount of dew on the mirror 10. The potentiometer 190, especially since its resistance is low relative to that of the regular cathode resistor 198 of the tube section 102a, has no objectionable effect on the amplifier gain or circuit balance.

Control of the relay 154—152 is primarily afforded by a switch 200, which in its manual position 201 connects the winding 154 for energization, through a rectifier 202, across the A. C. supply line 82, e. g. via conductors 203, 204. When the switch 200 is moved to automatic position 205, the supply circuit for the relay winding 154 extends in series (from the same source) through the rectifier 202 and a pair of contacts 206 which are actuated by a cam 208. The cam is continuously driven, for example by a motor 210 energized from the lines 203, 204, and is arranged to close the contacts 206 for a short interval at periodic times, for instance to energize the relay 154 for a period of 30 seconds every 20 minutes.

When the relay is energized and its switch assembly 152 is shifted to the R position, the re-balancing circuit is made effective in exactly the manner described in connection with Fig. 1. Full power is applied to the mirror 10, clearing it of dew, and the shutter 17 is re-positioned as necessary to establish equilibrium in the balancing loop, with the photocell bridge output at a value representing clear-mirror departure from a desired dew thickness. That is to say, the light shutter is thus left in a position where the algebraic sum of the signal from the photocells and the injected signal from the potentiometer 190 is zero in the tube section 102a; then when relay 154 is deenergized for normal operation, a certain amount of dew is required to produce zero photocell bridge output. The slow speed servo loop, in play during normal operation, functions to adjust the threshold control 34 as necessary from time to time so that the high speed loop always comes to rest with zero bridge output and thus with no more nor less than the selected amount of dew. The accuracy of dew-point temperature reading on the instrument 150 is thus constant over the entire, wide range of temperatures to which the apparatus may be responsive.

In ordinary use, the switch 200 is set at the automatic position 205, so that re-balancing occurs at the desired intervals, with the advantages of maintained accuracy, e. g. despite accumulations of dirt on the mirror, possible puddling of dew, changes in photocell response or other variations. On the other hand, the switch 200 can be set to the manual position whenever needed, for instance in original adjustment of the equipment or times when adjustment of the selected dew thickness seems necessary. In the manual position, the balancing loop functions in its described way, but permits ample time for dew thickness adjustment. The latter is manually achieved by moving the potentiometer 190, with corresponding, motor-driven displacement of the shutter 52a. Check of the actual dew thickness reached upon any such adjustment can be obtained by moving the switch 200 to the off position 212 or the automatic position 205, and then visually observing the mirror surface as normal operation of the high and low speed servo loops thereafter occurs.

It may be explained that the term dew thickness has been employed as a generic designation of the quantity of dew on the mirror 10. While pursuant to conventional practice changes in this quantity may simply be changes in actual thickness of dew covering the entire mirror surface, the present system is admirably adapted for use with improved arrangements and procedure whereby the amount of dew on the mirror is varied by change of size (diameter) of a spot of dew that normally covers much less than the entire mirror surface.

Subordinate details of the components in Figs. 2A and 2B may follow conventional electronic or electrical practice, as will be readily understood. For example, cathode heater supply current for various heater-type tubes may be derived from a single, center-grounded secondary of a transformer source (not shown). Plate power for all of tubes 100, 102, 106, 110, 134 and 162 may be obtained, as indicated, from a full wave rectifier tube 214 supplied with A. C. from a suitable center-tapped, high voltage secondary 215 of the transformer 122 and delivering a high voltage D. C. output through an appropriate filter system 216 to the positive plate supply line 217 and ground return, as shown.

The operation of the complete system in Figs. 2A and 2B has in effect been fully described above. The line switch 220 of the A. C. supply 82 is of course closed, and at the outset, balance of the phototube bridge is achieved with the balance control switch 200 in manual position 201. The thickness control 190 is adjusted at such time, to set the position of the shutter 52a, the actual amount of dew being checked visually by turning the switch 200 to the off position (which places the high and slow speed loops in continuous regular operation) for a short interval each time such check is desired. Then the switch 200 is turned to automatic position 205 and regular operation of the oscillator control loops proceeds. The mirror temperature is maintained at the dew-point, changing with the latter, all in such fashion as to keep the selected amount of dew on the mirror at all times. In consequence the instrument 150 gives a continuous, true reading of dew-point. At periodic intervals the cam 208 brings the re-balancing system into play, to correct for any change of conditions (such as dust on the mirror), preferably before such change can become significant. The entire system is wholly automatic, rugged, accurate and reliable, and its response is essentially independent of many possible variations such as of mirror condition, and of characteristics of electrical components or current supplies.

It is to be understood that the invention is not limited to the specific apparatus herein shown and described but may be carried out in other ways without departure from its spirit.

I claim:

1. In a dew-point hygrometer, in combination, a dew-forming element having electrical means for modifying the temperature thereof, said temperature-modifying means having a control circuit for adjusting the operation thereof in accordance with the electrical condition of the circuit, photoelectric means observing the element, for producing a signal output which departs from zero in one direction or the other in accordance with presence on the element of more or less than a predetermined amount of dew, electrical means controlled by the photoelectric means and varying the electrical condition of said control circuit in immediate response to change in the output of the photoelectric means due to change in dew condition of the element, for adjusting the temperature-modifying means to maintain the temperature of the element in equilibrium against continuance of change in dew condition of said element, said temperature-modifying means being adapted to require different electrical conditions in the control circuit to interrupt change in dew quantity at different temperatures of the element, so that said electrical means tends to produce said equilibrium at some temperatures with a non-zero signal representing continuing departure of the dew quantity from said predetermined amount, a supplemental electrical source connected to said control circuit, and supplemental means electrically controlled by the photoelectric means and adjusting said supplemental source in slower but continuous response to departure of the output of the photoelectric means from zero signal, for supplementarily varying the electrical condition of the control circuit so that the temperature-modifying means maintains equilibrium of the temperature of the element at the zero signal point providing the aforesaid predetermined amount of dew.

2. A dew-point hygrometer as described in claim 1 in which the photoelectric means includes means for adjusting the same to provide zero signal output at any selected one of various conditions of the element, and which includes control means operable at desired times to heat the element above the dew-point to remove dew therefrom, balancing means operable at desired times and controllable by the photoelectric means for adjusting the photoelectric adjusting means to provide a non-zero signal in response to dew-free condition of the element which is representative of departure of the element from a predetermined amount of dew.

3. A dew-point hygrometer as described in claim 2 in which the balancing means comprises a motor responsive to reception of a signal departing from zero, for driving the photoelectric adjusting means in a direction to reduce a signal from the photoelectric means to zero, and means for injecting in the control of the motor a signal opposing the signal from the photoelectric means to interrupt operation of the motor at a position producing the aforesaid dew-free condition signal in the output of the photoelectric means.

4. In a dew-point hygrometer, in combination, a dew-forming element having electrical means for modifying the temperature thereof, photoelectric means observing the element, for producing a signal output which departs from zero in one direction or the other in accordance with presence on the element of more or less than a predetermined amount of dew, electrical means controlled by the photoelectric means and in immediate response to change in the output thereof due to change in dew condition of the element, for adjusting the temperature-modifying means to maintain the temperature of the element in equilibrium against continuance of change in dew condition of said element, mechanically adjustable electrical means for supplementarily adjusting the temperature-modifying means, and motor means continuously under control of the photoelectric means and responsive to departure of the output thereof from zero signal, for adjusting the mechanically adjustable means to maintain said equilibrium of the temperature of the element at a point providing the aforesaid amount of dew.

5. A dew-point hygrometer as described in claim 4 in which the photoelectric means comprises phototube bridge means producing an alternating current signal governed in phase and magnitude respectively by the direction and extent of departure of the condition of the element from said predetermined amount of dew, said motor means comprising means for amplifying said alternating current signal and a reversible motor continuously connected to said amplifying means for energization by the amplified signal to adjust the mechanically adjustable means in direction and extent respectively governed by the phase and magnitude of the signal.

6. A dew-point hygrometer as described in claim 5 in which the photoelectric means includes an electric lamp illuminating the element and means supplying undulating current to said lamp for producing pulsating illumination thereby, and in which the phototube bridge means comprises a pair of phototubes respectively observing light specularly reflected by the element and light traveling from the lamp by another path, and a D. C. bridge circuit connecting said phototubes in normally balanced relation for zero signal output when the element carries said predetermined amount of dew, said undulating current supply means including an alternating current source having connections to said motor to effectuate the control thereof in accordance with the phase of a bridge unbalance signal relative to the said source.

7. In a dew-point hygrometer, in combination, a dew-forming element having a pair of temperature-modifying means for respectively heating and cooling said element, photoeletric means observing the element and responsive to change in dew caused by a changed dew-point, for producing an electrical signal which is governed in phase by the direction of departure of the element surface from a predetermined condition of dew thereon, one of said temperature-modifying means comprising electrical control means therefor, electrical means having connections to the photoelectric means, for controlling said control means in immediate response to a signal of the photoelectric means, to provide balance between said temperature modifying means to maintain the element at a temperature governed by the dew-point of gas in vicinity of the element, said first-mentioned electrical control means and said second-mentioned electrical means being constructed and arranged to interrupt change in dew on the element at a condition of said dew which varies with the said dew-point, a mechanically adjustable control device for supplementally controlling the aforesaid electrical control means, and electric motor means having connections to the photoelectric means and controlled by an electrical signal condition thereof that represents continuing departure of the element surface from the aforesaid predetermined dew condition, for adjusting said control device to restore balance of the temperature-modifying means with the element surface restored to the aforesaid predetermined dew condition at the changed dew-point.

8. A dew-point hygrometer as described in claim 7, wherein the photoelectric means comprises a pair of photoelectric elements respectively observing light specularly reflected from said dew-forming element, and other light, and circuit means connecting said photoelectric elements in opposing relation to produce a signal in accordance with difference in illumination of said photoelectric elements, said photoelectric means including means maintaining said photoelectric elements in balanced relation for zero-signal output of the photoelectric means when a predetermined amount of dew is present on the dew-forming element, the aforesaid connections of the motor means to the photoelectric means comprising means operating said motor means only when a signal is produced by the photoelectric means, for bringing said pair of temperature-modifying means into mutual balance with the photoelectric elements balanced in zero-signal condition.

9. In a dew-point hygrometer, in combination, a dew-forming element having cooling means and heating means therefor, photoelectric means observing the element for producing a signal in response to departure of the surface condition of the element from a predetermined amount of dew thereon, said photoelectric means comprising means controlling the phase of said signal in accordance with the direction of the aforesaid departure of the dew-forming element surface condition, electrical control means for electrically adjusting the heating means, means having connections to the photoelectric means for electrically adjusting said control means in response to a signal from the photoelectric means, for immediate adjustment of the heating means to maintain dew-forming balance of said heating and cooling means upon change in dew-point of gas at the dew-forming element, and threshold control means including motor means having connections to said photoelectric means for operation of the motor means only in response to a signal from the photoelectric means, and a supplemental electrical control device adjusted by said motor means for supplementarily adjusting the heating means, to maintain the aforesaid balance of the heating and cooling means with the aforesaid predetermined amount of dew on the dew-forming element.

10. In a dew-point hygrometer, in combination, a dew-forming element having temperature adjusting means therefor including electronic oscillator means for supplying electrical oscillations to heat the element, photoelectric dew-sensing means arranged in observation of the element for establishing an alternating electrical output which is governed in phase by the direction of departure of the quantity of dew on the element from a predetermined value and which is governed in magnitude by the extent of said departure, electronic means electrically controlled by said photoelectric means for establishing oscillation-controlling bias on said electronic oscillator means to increase and decrease the heating of said element in accordance with changes of dew-point, a reversible alternating current motor having a control winding, means including an amplifier for converting the alternating electrical output of the photoelectric means into alternating current energization of said control winding, to operate the motor in a direction corresponding to the phase of the said alternating electrical output, and means adjusted by said motor for modifying the aforesaid bias on the electrical oscillator means to maintain a substantially constant quantity of dew on said element as the supply of heat by the oscillator means is changed with change of dew-point.

11. Apparatus as described in claim 10, wherein the photoelectric means comprises a lamp illuminating the element and a pair of photoelectric devices respectively observing light directly transmitted from the lamp and light specularly reflected by the element, shutter means intermediate the lamp and the first photoelectric device, adjustable to provide desired electrical balance of said photoelectric devices, a second alternating current motor having a control winding, circuit-controlling means for modifying the control of the electrical oscillator means to supply dew-removing heat to the element, and circuit-controlling means for connecting the control winding of said last-mentioned motor to the aforesaid amplifier means in place of the first-mentioned motor, said second-mentioned motor being mechanically connected to said shutter and being electrically arranged for adjusting the shutter to restore balance of the photoelectric devices upon departure of same therefrom.

12. Apparatus as described in claim 11, which includes cycling apparatus having means for simultaneously operating both said first and second-mentioned circuit-controlling means, to clear the dew-forming element and subject the photoelectric devices to re-balancing adjustment of the shutter, at periodic intervals.

13. In a dew-point hygrometer, in combination, a dew-forming element, means for photoelectrically observing the element to produce a signal representative of departure of the surface of the element from a predetermined dew condition, said photoelectric means including devices adapted to deliver said signal varying from zero at balance of the devices, in accordance with the mutual response of the devices and means for adjusting the mutual response of said devices, means controllable by said photoelectric means and in response to the first-mentioned signal thereof and including temperature-modifying means for said element, for adjusting the element temperature to restore the element surface toward said predetermined zero-signal dew condition for restoring said signal of the photoelectric means substantially to zero, means operable at desired times for clearing dew from said element, said photoelectric means having an electrical circuit controlled thereby and having an output, for transmitting signals from said photoelectric means to said output, and means connected to said circuit and operable simultaneously with said dew clearing means, for injecting a predetermined signal in said circuit which is equal but opposite to a photoelectric means signal representing departure of the element from said predetermined dew condition to clear condition, to provide zero signal in said output in response to said clear condition when said response adjusting means is in a setting that will effect balance of the devices upon the predetermined dew condition, said signal-injecting means including means for adjustment thereof to vary the predetermined injected signal when it is desired to set the response adjusting means for balance of said devices at a different dew condition.

14. In a dew-point hygrometer, in combination, a dew-forming element having temperature adjusting means therefor including electrically controllable heating means, a source of light illuminating the aforesaid element, a pair of photoelectric devices respectively observing light specularly reflected by the element and light traveling another path from said source, said photoelectric devices having associated means connecting them to produce a signal which is responsive to difference in illumination of the devices and which is governed in phase by the direction of said difference, means connected to said photoelectric devices and electrically responsive thereto, for electrically adjusting said heating means in response to a signal from said devices, for normally maintaining the dew-forming element at a temperature governed by the dew-point of adjacent gas, means including a reversible driving motor therefor, for independently adjusting the amount of light received by one of said photoelectric devices, supplemental means controllable to modify the control of the heating means at a desired time, for providing a high dew-clearing temperature of the dew-forming element, a second supplemental means controllable for operation at a desired time, and for connection under control of the photoelectric devices, for actuating said motor of the independent light-adjusting means in a direction to reduce a signal from the photoelectric devices, and adjustable means in said second-mentioned supplemental means for introducing a signal opposing the signal from the photoelectric devices, to bring said independent light-adjusting means to rest in position where the photoelectric devices, when observing the element free of dew, are unbalanced in illumination by an amount which would be nullified by a predetermined amount of dew on said element.

15. A dew-point hygrometer as described in claim 14, in which the source of light is an electric lamp having means supplying undulating current thereto for producing pulsating illumination thereby, and in which the aforesaid connecting means comprises a D. C. bridge circuit connecting said photoelectric devices in normally balanced relation, for producing the aforesaid signal as an A. C. signal governed by said pulsating illumination, and in which said reversible motor is an A. C. motor and said second supplemental means comprises means for amplifying said A. C. signal to energize the motor thereby, said undulating current supply means including an alternating current source having connections to said motor to effectuate the control thereof in accordance with the phase of a bridge unbalance signal relative to the said source.

16. In a dew-point hygrometer, in combination, a dew-forming element having temperature-modifying means therefor, said temperature-modifying means having a control circuit electrically controllable in accordance with D. C. bias supplied to said circuit, a pair of photoelectric elements, an electric lamp disposed to illuminate the dew-forming element, one of said photoelectric elements being disposed for illumination by light specularly reflected by the element and the other photoelectric element being disposed for illumination by light along another path from the lamp, means including a source of alternating current, for energizing said lamp to produce pulsating illumination thereby, electrical means connecting said photoelectric elements in normally balanced zero-output relation, for producing an alternating current signal upon unbalance of said electrical means by departure of the relative illumination of said photoelectric elements by said lamp from a condition of illumination representative of a predetermined dew condition on the dew-forming element, said electrical means including means delivering such signal governed in phase relative to said alternating current by the direction of said change, and demodulating means under control of the aforesaid electrical means and of alternating current from the aforesaid source, for applying to said control circuit, for control of said temperature-modifying means, a D. C. voltage which is responsive to an alternating current signal from the photoelectric elements and which is controlled in polarity by the phase of said signal.

17. A dew-point hygrometer as described in claim 16 in which the means for energizing the lamp comprises a degenerative amplifier having its input connected to the source of alternating current and having an output circuit, for producing unidirectional pulsating current in said output circuit having a frequency of peaks equal to the frequency of the alternating current, said output circuit being connected to energize the lamp.

References Cited in the file of this patent

UNITED STATES PATENTS

| | | |
|---|---|---|
| 2,466,696 | Friswold | Apr. 12, 1949 |
| 2,536,111 | Van Dyke | Jan. 2, 1951 |
| 2,624,195 | Van Alen | Jan. 6, 1953 |
| 2,638,783 | Rittner et al. | May 19, 1953 |